Sept. 19, 1939. D. J. PYE ET AL 2,173,133
PROCESS FOR THE PRODUCTION OF ALKYL BROMIDE
Filed July 6, 1937
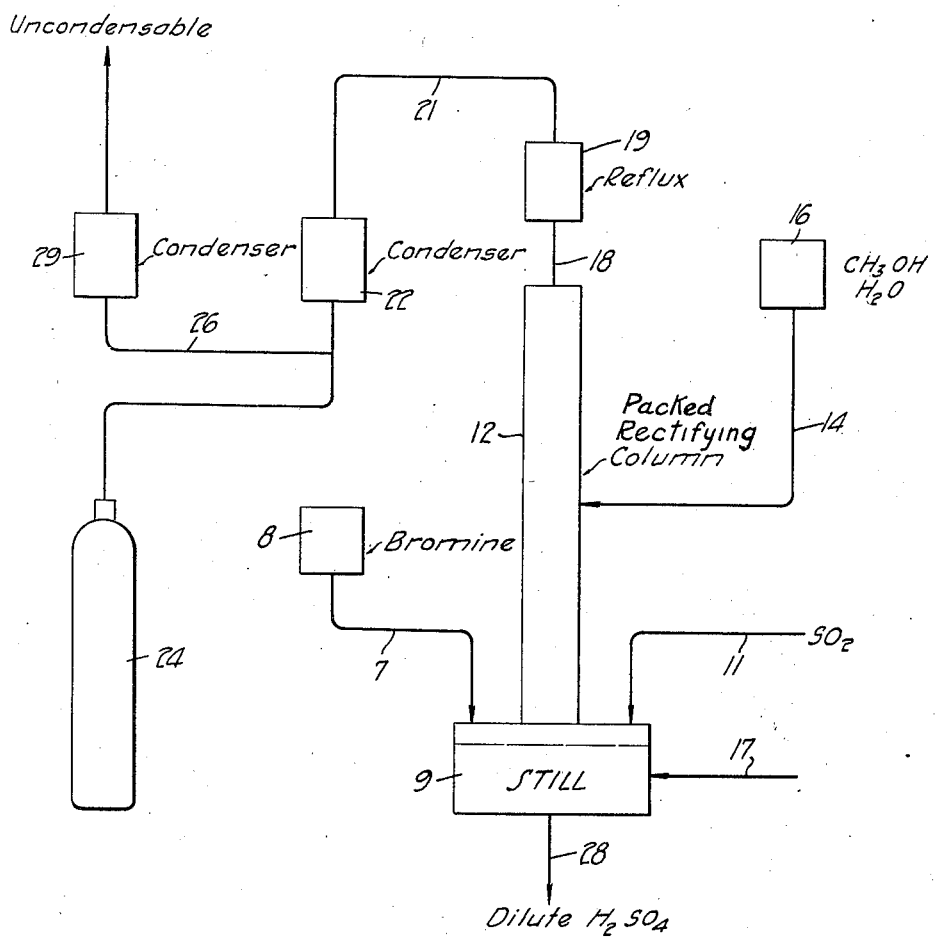
INVENTORS
David J. Pye
Harry H. Purcell
BY Robert H. Eckhoff
ATTORNEY.

Patented Sept. 19, 1939

2,173,133

UNITED STATES PATENT OFFICE 2,173,133

PROCESS FOR THE PRODUCTION OF ALKYL BROMIDE

David J. Pye and Harry H. Purcell, Pittsburg, Calif., assignors, by mesne assignments, to The Dow Chemical Company, Midland, Mich., a corporation of Michigan Application July 6, 1937, Serial No. 152,085

11 Claims. (Cl. 260—657)

This invention relates to the manufacture of alkyl bromides and more particularly to the manufacture of methyl bromide.

Alkyl bromides are ordinarily manufactured by the reaction of aliphatic alcohols with hydrobromic acid in presence or absence of a dehydrating agent. The hydro-bromic acid can either be generated in situ from bromides and sulphuric acid or externally from bromine and hydrogen. In the former case more expensive materials are involved, while the latter case presents a separate reaction step. The yields depend on the status of the dehydrating agent which changes during the reaction.

It is in general the broad object of this invention to provide a novel but simple process for manufacture of alkyl bromide in high purities wherein high overall yields are readily obtained in one single operation.

We have found that methyl bromide can be produced directly by reacting methyl alcohol with bromine in presence of a reducing agent such as sulphur dioxide, with a yield of approximately 90% based on alcohol and better than 95% based on bromine. The reaction proceeds as follows:

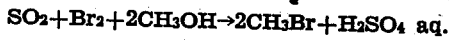

$SO_2+Br_2+2CH_3OH \rightarrow 2CH_3Br+H_2SO_4$ aq.

In practicing the process we have found that it is desirable to carry out the reaction as expressed above in presence of water. However, we have also determined that the water content should be carefully regulated and that the acid concentration should be confined within certain limits. If the acid is too concentrated the formation of ether can occur, while if the acid is too dilute, bromine in the form of hydro-bromic acid is lost in the effluent sulphuric acid. To secure good yields we have found that the water content should be maintained between the limits of 30 to 75% on the basis of sulphuric acid formed and we prefer to operate so as to keep the acid strength at about 60%. A water content of 30% on the basis of the acid formed corresponds to 2.34 mols of water per mol of acid. A water content of 75% on the basis of the acid formed corresponds to 16.3 mols of water per mol of acid. An acid strength of 60% corresponds to 40% water present or 3.6 mols of water per mol of acid.

In practicing the process, we may use the apparatus shown diagrammatically in the drawing. Bromine is introduced through line 7 from a container 8 into a still 9. This still is usually externally heated to boil the contents thereof, $SO_2$ is introduced into the still pot 9, through line 11. The still pot carries a packed column 12 and methyl alcohol is conveniently introduced through line 14 from vessel 16. Conveniently the methyl alcohol is diluted with about an equal weight of water. If the water is not added, the concentrated sulphuric acid formed tends to form the methyl sulphuric acid ester and, as a consequence, ether formation follows. We prefer to operate with about 3.5 mols of water present on a stoichiometric basis. When higher alcohols such as ethyl, propyl, butyl, amyl and higher, including hexyl alcohol, are employed, these can be added through line 17 into the still 9.

At the top of the column, line 18 connects to a reflux 19, while uncondensed material is passed over through line 21 to a total condenser maintained at such a low temperature that substantially all except fixed gases are condensed.

A liquid fraction is run through line 23 into a suitable container 24 such as a steel cylinder, while the vapor content is separated out through line 26 and this is passed into the atmosphere under the protection of a low temperature condenser 27. Line 28 serves for the continuous or intermittent bleeding off of dilute sulfuric acid.

In continuous operation we have found that yields of 90% can be easily obtained, on the basis of the alcohol employed, while yields of better than 95% on the basis of bromine and $SO_2$ are recovered.

As already stated at the outset, present processes for manufacture of methyl bromide necessitate either the use of the more expensive alkali metal bromides and sulphuric acid or else the generation of hydro-bromic acid outside of the reaction vessel from bromine and hydrogen. This not only presents an additional step but also a hazard since the reaction of hydrogen and bromine can take place with explosive violence.

The advantage of the present process is to produce methyl bromide in one single step at a high purity, obviating the necessity of reprocessing the mother liquors.

The reaction is broadly applicable and can be used to carry out the following reaction wherein ROH is any aliphatic hydroxyl compound:

$xH_2O+SO_2+Br_2+2ROH \rightarrow 2RBr+H_2SO_4.xH_2O$ whether primary, secondary or tertiary and whether the material be mono-, di-, tri-hydroxy or poly-hydroxy. Other halogens may be used.

Both the reactions heretofore are summation reactions. As a matter of fact, the actual reactions are several in number, if we include those for ether formation. Actually the essential reactions for methyl bromide formation are as follows:

$$SO_2 + Br_2 + 2H_2O \rightarrow H_2SO_4 + 2HBr$$
$$2HBr + 2CH_3OH \rightarrow 2CH_3Br + 2H_2O$$

If these are added then we have:

$$SO_2 + Br_2 + 2CH_3OH + 2H_2O \rightarrow 2CH_3Br + H_2SO_4 \cdot 2H_2O$$

With water present sulphur chloride is not formed nor is methyl alcohol wasted in dimethyl sulphate formation. In carrying out the reaction we have found that from 2.34 mols to 16.3 mols of water can be employed (30% to 75% water on the basis of the acid present) with 3.6 mols as the preferred stoichiometric quantity.

As suitable materials having an aliphatic hydroxyl group we mention methyl, ethyl, propyl, butyl, amyl, hexyl, heptyl, actyl, nonyl and decyl alcohols, including the primary, secondary and tertiary forms thereof and isomers, including specifically, in addition to those mentioned, the alcohols identified as isopropyl, secondary and tertiary butyl, normal amyl, isobutylcarbinol, active amyl, tertiary butyl carbinol, the three secondary amyls, diethyl carbinol, methyl-n-propylcarbinol, methyl-iso-propyl carbinol and dimethylethyl carbinol.

We claim:

1. A process for production of methyl bromide comprising heating bromine, methyl alcohol and sulphur dioxide in the presence of water to form methyl bromide and sulphuric acid as the end reaction products, water being present in a quantity sufficient to dilute the acid whereby sulphation of the alcohol is substantially avoided.

2. A process for production of alkyl bromide comprising heating bromine, a saturated aliphatic alcohol and sulphur dioxide in the presence of water to form an alkyl bromide and sulphuric acid as the end reaction products, water being present in a quantity sufficient to dilute the acid whereby sulphation of the alcohol is substantially avoided.

3. A process for production of methyl bromide comprising heating bromine and sulphur dioxide and methyl alcohol to form methyl bromide and sulphuric acid in the presence of a quantity of water sufficient to dilute the acid to prevent substantially formation of esters and ethers, including dimethyl ether, but insufficient to dissolve substantial quantities of hydrobromic acid.

4. A process for production of an alkyl bromide comprising heating bromine and sulphur dioxide and a saturated aliphatic alcohol to form an alkyl bromide and sulphuric acid in the presence of a quantity of water sufficient to dilute the acid to prevent substantially formation of esters and ethers but insufficient to dissolve substantial quantities of hydrobromic acid.

5. A process for production of an alkyl bromide comprising heating bromine and sulphur dioxide and a saturated aliphatic alcohol having less than four carbon atoms to form an alkyl bromide and sulphuric acid as the end reaction products, water being present in a quantity sufficient to dilute the acid whereby sulphation of the alcohol is substantially avoided.

6. A process for production of methyl bromide comprising heating in reacting proportions a liquid mixture including bromine, sulphur dioxide, water and methyl alcohol and removing as the end products of the reaction sulphuric acid and methyl bromide, while continuously admitting at least one of the reactants, water being present in a quantity sufficient to dilute the acid whereby sulphation of the alcohol is substantially avoided.

7. A continuous process for the manufacture of methyl bromide comprising continuously adding together in reacting proportions sulfur dioxide, bromine, water and methyl alcohol and heating the resulting mixture to react said mixture and distill off methyl bromide while removing dilute sulfuric acid as such, water being present in a quantity sufficient to dilute the acid whereby sulphation of the alcohol is substantially avoided.

8. The process which comprises heating a mixture of bromine, $SO_2$, methyl alcohol and water to react said mixture in substantially the stoichiometric proportions required by the reaction—

$$xH_2O + Br_2 + SO_2 + 2CH_3OH \rightarrow 2CH_3Br + H_2SO_4 \cdot xH_2O$$

wherein the value of $x$ is between 2.34 and 16.3.

9. A process as in claim 8 wherein the value of $x$ is less than 16.3 and sufficient water is present to substantially prevent sulfation of the alcohol, ester and ether formation.

10. A process as in claim 8 wherein the value of $x$ is maintained at about 3.5.

11. The process which comprises a heating mixture of bromine, $SO_2$, a saturated aliphatic alcohol to react said mixture substantially in the stoichiometric requirements of the reaction $$Br_2 + SO_2 + 2CH_3OH \rightarrow 2CH_3Br + H_2SO_4$$

and in the presence of about 75% water on the basis of the sulfuric acid formed.

DAVID J. PYE.
HARRY H. PURCELL.